(12) United States Patent
Van Hardeveld et al.

(10) Patent No.: US 7,846,325 B2
(45) Date of Patent: Dec. 7, 2010

(54) PROCESS FOR THE REMOVAL OF COS AND $H_2S$ FROM A SYNTHESIS GAS STREAM COMPRISING $H_2S$ AND COS

(75) Inventors: Robert Martijn Van Hardeveld, Rotterdam (NL); Rudolf Henri Max Herold, Amsterdam (NL); Adriaan Johannes Kodde, Amsterdam (NL); Thijme Last, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/632,883

(22) PCT Filed: Jul. 22, 2005

(86) PCT No.: PCT/EP2005/053563

§ 371 (c)(1), (2), (4) Date: Feb. 19, 2008

(87) PCT Pub. No.: WO2006/008317

PCT Pub. Date: Jan. 26, 2006

(65) Prior Publication Data

US 2008/0242749 A1   Oct. 2, 2008

(30) Foreign Application Priority Data

Jul. 22, 2004   (EP) ................... 04254366

(51) Int. Cl.
*C01D 17/00* (2006.01)
*B01D 53/86* (2006.01)
*C07C 27/00* (2006.01)

(52) U.S. Cl. .......... 208/247; 423/230; 423/244.06; 423/244.01; 518/713

(58) Field of Classification Search ........ 518/713, 518/714
See application file for complete search history.

(56) References Cited

U.S. PATENT DOCUMENTS

| | | | |
|---|---|---|---|
| 3,441,370 A | 4/1969 | Gutmann et al. | 23/2 |
| 3,974,256 A * | 8/1976 | Wheelock et al. | 423/230 |
| 4,254,094 A | 3/1981 | Hegarty | 423/658.8 |
| 4,871,710 A * | 10/1989 | Denny et al. | 502/414 |
| 4,888,131 A | 12/1989 | Goetsch et al. | 252/373 |
| 5,463,168 A | 10/1995 | Audeh et al. | 585/854 |
| 6,103,206 A | 8/2000 | Taylor et al. | 423/210 |
| 6,322,763 B1 | 11/2001 | McDaniel | 423/242.1 |
| 6,444,185 B1 * | 9/2002 | Nougayrede et al. | 423/242.1 |
| 6,692,711 B1 | 2/2004 | Alexion et al. | 423/210 |

FOREIGN PATENT DOCUMENTS

| | | | |
|---|---|---|---|
| AU | 698392 | | 10/1998 |
| CA | 2 104 158 | * | 8/1992 |
| EP | 700717 | | 3/1996 |
| EP | 757969 | | 2/1997 |
| RU | 2101324 | | 1/1998 |
| WO | 9210270 | | 6/1992 |
| WO | 9501217 | | 1/1995 |
| WO | 9934917 | | 7/1999 |
| WO | 03011436 | | 2/2003 |

OTHER PUBLICATIONS

International Search Report dated Sep. 26, 2005.
H.M. Huisman: "The hydrolysis of carbonyl sulphide, carbon disulphide and hydrogen cyanide on a titania catalyst", 1994, Ph.D. Thesis University of Utrecht, The Netherlands.
B.P. Williams, et al.: "Carbonyl sulphide hydrolysis using alumina catalysts", Catalyst Today, 1999, pp. 99-104.
D.L. Smith: "Optimize solid bed adsorption systems", Hydrocarbon Process, May 1996, pp. 130-132.
Puraspec 2040 Sulphur Absorption, Synetix product data sheet Johnson Matthey, 2003, 1 page.

* cited by examiner

*Primary Examiner*—Jafar Parsa
*Assistant Examiner*—Yate' K Cutliff
(74) *Attorney, Agent, or Firm*—Leonard P. Miller; Charles W. Stewart

(57) ABSTRACT

The invention provides a process for the removal of COS and $H_2S$ from a synthesis gas stream comprising COS and $H_2S$, the process having the steps of: removing $H_2S$ from a feed synthesis gas stream with a first solid adsorbent to obtain a first synthesis gas stream, converting COS in the first synthesis gas stream to $H_2S$ by contacting the first synthesis gas stream with a COS-hydrolysing catalyst in the presence of water in a hydrolysis zone to obtain a second synthesis gas stream depleted of COS and enriched in $H_2S$; and removing $H_2S$ from the second synthesis gas stream by contacting the second synthesis gas stream with a second solid adsorbent in a $H_2S$ removal zone to obtain a third synthesis gas stream depleted of $H_2S$ and depleted of COS to very low levels.

19 Claims, No Drawings

PROCESS FOR THE REMOVAL OF COS AND $H_2S$ FROM A SYNTHESIS GAS STREAM COMPRISING $H_2S$ AND COS

The present application claims priority to European Patent Application 04254366.0 filed 22 Jul. 2004.

FIELD OF THE INVENTION

The invention relates to a method for the removal of COS from a synthesis gas stream comprising $H_2S$ and COS.

BACKGROUND OF THE INVENTION

Synthesis gas streams are gaseous streams being rich in carbon monoxide and hydrogen and further usually containing carbon dioxide, while also nitrogen, nitrogen-containing components (such as HCN and $NH_3$) and steam may be present, as well as some other minor constituents. Synthesis gas streams are generally used for chemical processes, for example the preparation of hydrocarbons in a catalytic process, e.g. the so-called Fischer-Tropsch process.

Often, desulphurization of the feedstock used for the preparation of synthesis gas is difficult to achieve or incomplete and consequently unwanted contaminants such as sulphur compounds, especially $H_2S$ and COS, are still present in synthesis gas. The removal of these sulphur compounds is of considerable importance, because they may bind irreversibly on catalysts and cause sulphur poisoning. This results in a deactivated catalyst, which severely hampers the catalytic process. To this end, the removal of sulphur compounds to very low levels, in the ppb range, is required.

A process for producing a low sulphur synthesis gas suitable for high-performance Fischer-Tropsch catalysts is mentioned in U.S. Pat. No. 6,692,711. This process aims at deep desulphurization of the natural gas feedstock and teaches the use of ZnO and nickel in the natural gas. The use of ZnO only is well established for the removal of $H_2S$ in natural gas but it will not remove COS, as is observed in U.S. Pat. No. 6,692,711. The remedy applied in U.S. Pat. No. 6,692,711 is to use nickel to remove COS. However, when the aim is to remove COS from synthesis gas, the use of nickel is likely to result in unwanted side reactions such as the hydrogenation of CO and $CO_2$. Nickel is a known methanation catalyst, see for example U.S. Pat. No. 4,888,131. The formation of methane is a highly exothermic reaction and thus very undesired. The process described in U.S. Pat. No. 6,692,711 can therefore not be applied to remove COS from a synthesis gas stream.

Processes for the removal of COS from a synthesis gas stream are known in the art. See for example H. M. Huisman, "The hydrolysis of carbonyl sulphide, carbon disulphide and hydrogen cyanide on a Titania catalyst", 1994, Ph.D Thesis University of Utrecht, The Netherlands, ISBN 90-393-0534-X.

Another example is found is U.S. Pat. No. 6,322,763, in which a process is described wherein water in a wet scrubber is used to achieve hydrolysis of COS according to:

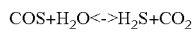

A disadvantage of the process is that it relies on a non-catalytic process and a "naturally occurring catalyst". As an example alumina oxide as present in coal ash is used in the process described in U.S. Pat. No. 6,322,763. For other gasification processes such as oil-residue gasification and natural gas gasification, this catalyst will not be present and any particulate matter originating from the gasification step is usually removed by scrubbing prior to desulphurisation steps.

An even more important disadvantage of the process described in U.S. Pat. No. 6,322,763 is that the concentration of COS in the synthesis gas stays in the ppm range, which may result in catalyst poisoning in a catalytic conversion of the synthesis gas. The removal of COS to a very low concentration, typically in the ppbv range, cannot be achieved using a process as described in U.S. Pat. No. 6,322,763.

Especially when relatively high amounts of $H_2S$ are present in the synthesis stream, the hydrolysis of COS is difficult. $H_2S$ is a reactant and therefore would push back the hydrolysis of COS. The achievement of low concentrations of COS would be difficult.

Catalysts for the production of hydrocarbons from synthesis gas in a Fischer-Tropsch process are easily poisoned and can be permanently deactivated by sulphur. Even levels as low as 10 ppbv are unacceptable for a commercial hydrocarbon synthesis plant. Catalysts containing cobalt as a catalytically active element are particularly sensitive. Even levels as low as for example 5 ppbv are unacceptably high for a commercial hydrocarbon synthesis process wherein a cobalt catalyst is used. As the catalyst deactivates, hydrocarbon production decreases and the reactor has to be taken off line for catalyst replacement.

The removal of sulphur contaminants from synthesis gas, in particular the removal of COS which is more difficult to achieve compared to the removal of $H_2S$, is therefore imperative in order to operate a productive hydrocarbon synthesis process.

Therefore, there is a need for a simple process enabling the removal of COS from synthesis gas to a low level, especially in the ppbv range, in the presence of $H_2S$.

SUMMARY OF THE INVENTION

The invention provides a process for the removal of COS from a first synthesis gas stream comprising COS and up to 10 ppmv $H_2S$ and COS, wherein the first synthesis gas stream is obtained by removing $H_2S$ from a feed synthesis gas stream by contacting the feed gas stream with a solid adsorbent to obtain the first synthesis gas stream, the process having the steps of:
(a) converting COS in the first synthesis gas stream to $H_2S$ by contacting the first synthesis gas stream with a COS-hydrolysing catalyst in the presence of water in a hydrolysis zone to obtain a second synthesis gas stream depleted of COS and enriched in $H_2S$;
(b) removing $H_2S$ from the second synthesis gas stream by contacting the second synthesis gas stream with a solid adsorbent in a $H_2S$ removal zone to obtain a third synthesis gas stream depleted of $H_2S$ and depleted of COS.

DETAILED DESCRIPTION OF THE INVENTION

The process according to the invention enables the removal of COS in the ppbv range, resulting in a third synthesis gas stream having a COS concentration of typically below 5 ppbv, usually below 1 ppbv.

Typically, synthesis gas is generated in high temperature reformers, autothermal reformers or in gasifiers. See for example Maarten van der Burgt et. al. in "The Shell Middle Distillate Synthesis Process, Petroleum Review April 1990 pp 204-209".

Synthesis gas generated in reformers comprises conventionally substantial amounts of carbon monoxide and hydrogen and further comprises carbon dioxide, steam, various inert compounds and impurities such as sulphur compounds.

Synthesis gas generated in gasifiers conventionally comprises lower levels of carbon dioxide.

The amount of $H_2S$ and COS in the first synthesis gas stream depends on the source from which the synthesis gas is generated. Common sources are natural gas, oil residues or coal, which can all be used to generate a feed synthesis gas stream.

Generally, in natural gas the amount of $H_2S$ and COS is below 15 volume %, typically below 5 volume %, based on the natural gas. In some cases the amount of $H_2S$ and COS is in the range of from 5 to 15 ppmv, based on the natural gas.

After gasification or reforming or autothermal reforming of natural gas, the amount of $H_2S$ and COS in the gas stream leaving the gasifier or reformer will generally be reduced to an amount of between one fifth and half, typically one third of the amount in the natural gas. Typically, the amount of $H_2S$ and COS in the gas stream leaving the gasifier will be below 5 volume %, or even below 1 volume %, in some cases in the range of 1 to 5 ppmv, preferably 3-4 ppmv, based on the gas stream.

If the source is coal, generally the amount of $H_2S$ and COS in the gas stream leaving the gasifier is below 15 volume %, typically below 5 volume % based on the gas stream. In some cases the amount of $H_2S$ and COS in the gas stream leaving the gasifier is in the range of from 5 to 15 ppmv, based on the gas stream, typically 8-12 ppmv based on the gas stream.

If the source is an oil residue, generally the amount of $H_2S$ and COS in the gas stream leaving the gasifier will be below 20 volume %, typically below 10 volume % based on the gas stream. In some cases the amount of $H_2S$ and COS in the gas stream leaving the gasifier is in the range of from 15 to 30 ppmv, typically 20-28 ppmv based on the gas stream.

In addition to the $H_2S$ occurring in the synthesis gas as a result from the source, $H_2S$ can also be present because it has been added to the synthesis gas to prevent or suppress metal dusting. Metal dusting corrosion involves disintegration of metals and alloys into small particles of metal, metal carbides, metal oxides and carbon. It is believed that the transfer of carbon from the gas phase to the metal or alloy plays a key part in metal dusting. Carbon monoxide is the predominant cause of metal dusting, but hydrocarbons can also lead to metal dusting. For kinetic reasons metal dusting only proceeds significantly at a temperature of above a certain level, typically 300° C. The presence of $H_2S$ in a carbon monoxide containing gas can suppress metal dusting. The $H_2S$ source may be for example a gas containing $H_2S$ or another sulphur compounds, which at the process conditions will decompose into $H_2S$, for example dimethyldisulphide.

For the purposes of the invention, the amount of $H_2S$ and COS in the first synthesis gas stream will be up to 10 ppmv, preferably up to 5 ppmv, more preferably up to 500 ppbv $H_2S$, still more preferably up to 300 ppbv $H_2S$ and most preferably up to 100 ppbv $H_2S$, based on the total gas stream. The preferred ranges ensure an even more effective removal of COS, even to the 1 ppbv level.

The amount of COS in the first synthesis gas stream depends on the composition of the source from which the synthesis gas is derived and the technology applied for the production of synthesis gas.

Generally, the amount of COS in the first synthesis gas stream is from about 1 ppbv to about 500 ppbv, preferably from about 2 ppbv to about 200 ppbv, more preferably from about 10 ppbv to about 100 ppbv, based on the first synthesis gas stream.

The ratio between $H_2S$ and COS in the synthesis gas is set by the equilibrium between COS and $H_2S$ at the conditions prevailing in the synthesis gas generating unit. The process according to the invention is especially suitable for synthesis gas streams having a $H_2S$:COS ratio in the range from 100:40 to 90:30, especially about 80:20.

In those cases where the amount of $H_2S$ and COS in the feed synthesis gas leaving the synthesis gas producing unit, which can be for example a gasifier, a reformer or an autothermal reformer, exceeds 10 ppmv, the sulphur amount in the synthesis gas can be reduced first by conventional scrubbing technologies applied either on the synthesis gas exiting the synthesis gas generation unit and/or on the feedstock entering the synthesis gas generation unit in the case of natural gas as feedstock.

This results in an amount of $H_2S$ in the first synthesis gas stream up to 10 ppmv, which enables executing the process of the invention.

Therefore, in one preferred embodiment a process using one or more solvent formulations based on amines or physical solvents is used to remove a large part of the $H_2S$ from the feed synthesis gas leaving a synthesis gas generation unit to generate a first synthesis gas stream having an amount of $H_2S$ up to 10 ppmv.

In a more preferred embodiment, the process is selected from the group of ADIP, Sulfinol, Flexsorb, Purisol and Selexol. These processes are described in Kohl and Riesenfeld, third edition.

In another preferred embodiment, a process based on the direct oxidation of $H_2S$ is applied. For example, a redox process in which the $H_2S$ is directly oxidised to elemental Sulphur using an iron chelate compound while the ferric ions are reduced, followed by regeneration of the ferric ions by oxidation with air. This process is known as the SulFerox process. Another example is a combination of scrubbing the feed synthesis gas with an alkali compounds to convert $H_2S$ to $RS^-$, followed by oxidation of $RS^-$ using a biological agent. See for example WO 92/10270.

In yet another preferred embodiment, refrigrated methanol is used as a scrubbing solvent for the synthesis gas leaving the synthesis gas generation unit. When using refrigrated methanol, sulphur levels of 0.1 ppmv can be achieved.

All these processes can remove sulphur components till levels of well above 1 ppmv, typically 10 ppmv or more.

In the first step of the process according to the invention, COS is hydrolyzed in a COS hydrolysis zone.

Generally, temperatures in the COS hydrolysis zone are in the range of from about 100° C. to 400° C., preferably from about 160° C. to 240° C. Typical pressures in the COS hydrolysis zone are in the range of from 5 to 150, preferably from 15 bara to 80 bara, more preferably from 20 bara to 70 bara.

Typical GHSV values are in the range of from 100 $m^3/m^3/h$ to 1000 $m^3/m^3/h$, especially from 200 $m^3/m^3/h$ to 600 $m^3/m^3/h$.

Suitable COS-hydrolyzing catalysts are refractory oxide catalysts, preferably a refractory oxide catalyst selected from the group of silica, ceria, gallia, zirconia, titania, alumina and silica, zirconia, more preferably titania. The COS hydrolysis catalysts may be promoted, preferably by one or more metals selected from Group IA, Group IIA and the Group of the Lanthanides of the Periodic Table of the Elements. Suitable COS-hydrolyzing catalysts are also supported catalysts comprising one or more metal ions selected from Group VB, Group VIB and Group VIIB of the Periodic Table of the Elements. A suitable support is a porous refractory oxide support, preferably alumina, silica or titania or mixtures thereof.

It has been found that titania enables the removal of COS even in the presence of substantial amounts of $CO_2$. Generally, the amount of $CO_2$ in the synthesis gas stream is from 0.1 to 20 vol %, especially from 0.5 to 10 volt, more especially from 0.5 to 2 vol %, based on the synthesis gas stream. Especially when using alumina, a competitive effect of adsorption of $CO_2$ onto the catalyst is observed, resulting in a decrease in COS hydrolyizing activity. Therefore, the use of titania as a COS hydrolyzing catalyst is preferred. A further advantage of the use of titania is that in the presence of HCN in the synthesis gas, HCN will also be hydrolysed. The use of titania enables the removal of both COS and HCN, thereby further reducing the chance of an unwanted catalyst poisoning. It is observed that even in the case of already relatively low amounts of $CO_2$, e.g. 0.5 to 2 vol % based on the syngas stream, there is a clear preference for titania over alumina, in view of the above-mentioned descreased COS hydrolysing activity.

Typically, COS is converted at a temperature of between 160 and 260° C., preferably between 180 and 220° C. By selecting a temperature in the preferred ranges, the reaction will proceed at a favourable rate. Furthermore, the occurrence of side reactions such as the formation of methylmercaptan, formamide or formic acid will be suppressed almost completely.

In the process according to the invention, $H_2S$ is removed from the first gas stream by contacting the first gas stream with a solid adsorbent. Suitable solid adsorbents comprise one or more metals or oxides of metals or combinations thereof, the metals being selected from the group of Ag, Sn, Mo and Zn. A preferred solid adsorbent is ZnO, because of its good performance and because it allows a simple operation of the process. Another important advantage of ZnO is that the occurrence of unwanted side reactions such as water gas shift, hydrogenation of CO and $CO_2$ and methanol synthesis is much less.

The adsorbent may be supported on an inorganic support material in order to, for example, increase the surface area, pore volume and pore diameter. Preferably, an inorganic refractory support material selected from the group of alumina, silica, titania, zirconia, carbon, silicon carbide and kieselguhr is used. Either one type of support materials can be used or mixtures of different the support materials can be used.

Generally, $H_2S$ is removed from the first synthesis gas stream at a temperature in the range of from about 70 to about 260° C., preferably from about 140 to about 240° C.

Typically, $H_2S$ is removed from the second synthesis gas stream to a level of 10 ppbv or less, preferably 5 ppbv or less, more preferably 1 ppbv or less in the third gas stream, based on the third gas stream. The process according to the invention typically results in a removal of COS from the first synthesis gas stream to a level of 10 ppbv or less. In most cases the amount of COS in the second synthesis gas stream leaving the COS removal zone is 5 ppbv or less, or even 1 ppbv or less, based on the second synthesis gas stream.

The removal of COS in the COS hydrolysis zone takes place according to:

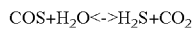

It will be understood that the concentrations of all four species, COS, $H_2O$, $H_2S$ and $CO_2$, influence the thermodynamic equilibrium of the COS hydrolysis. The amount of $H_2S$ at thermodynamic equilibrium with COS, at a COS concentration at the end of the COS hydrolysis zone of 1 ppbv, at a given temperature and at given concentrations of $H_2O$ and $CO_2$ is referred to as [$H_2S$]equilibrium.

The process according to the invention comprising the two steps of COS hydrolysis followed by $H_2S$ adsorption, is especially suitable for purifying synthesis gas streams wherein the total concentration of $H_2S$ and COS does not exceed [$H_2S$] equilibrium. A removal of COS to a level of 1 ppbv can then be achieved at a GHSV of between 100 and 1000 $m^3/m^3/h$, especially about 400 $m^3/m^3/h$.

When the total amount of COS in the feed synthesis gas stream is less than [$H_2S$]equilibrium, a $H_2S$ removal step preceding the COS hydrolysis is advantageous. In this embodiment, $H_2S$ is removed from a feed synthesis gas stream by contacting the feed synthesis gas stream with a solid adsorbent. Suitable solid adsorbents comprise one or more metals or oxides of metals or combinations thereof, the metals being selected from the group of Ag, Sn, Mo and Zn. A preferred solid adsorbent is ZnO, because of its good performance and because it allows a simple operation of the process. Another important advantage of ZnO is that the occurrence of unwanted side reactions such as water gas shift, hydrogenation of CO and CO2 and methanol synthesis is much less. After $H_2S$ removal, a first synthesis gas stream having a sufficiently low $H_2S$ amount is then led to a COS hydrolysis zone according to the invention.

When the total amount of COS in the feed synthesis gas stream exceeds [$H_2S$]equilibrium, it is preferred to combine steps 1 and 2 of the invention. In this embodiment, an admixture of hydrolysis catalyst and $H_2S$ adsorbent is used. A most suitable admixture is an admixture comprising titania and ZnO. This admixture enables the removal of COS to levels as low as 1 ppbv or less, based on the second gas stream, while at the same time enabling the removal of $H_2S$ to levels as low as 1 ppbv.

The third synthesis gas stream, which is now purified synthesis gas comprising predominantly hydrogen and carbon monoxide and very low levels of $H_2S$ and COS, may be contacted with a suitable catalyst in the catalytic conversion stage, in which the normally liquid hydrocarbons are formed.

The catalysts used for the catalytic conversion of the mixture comprising hydrogen and carbon monoxide into hydrocarbons are known in the art and are usually referred to as Fischer-Tropsch catalysts. Catalysts for use in this process frequently comprise, as the catalytically active component, a metal from Group VIII of the Periodic Table of Elements. Particular catalytically active metals include ruthenium, iron, cobalt and nickel. Cobalt is a preferred catalytically active metal.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania.

The amount of catalytically active metal on the carrier is preferably in the range of from 3 to 300 pbw per 100 pbw of carrier material, more preferably from 10 to 80 pbw, especially from 20 to 60 pbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are very suitable promoters. Particularly preferred metal oxide promoters for the catalyst used to prepare the waxes for use in the present invention are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier. The most preferred promoters are selected from vanadium, manganese, rhenium, zirconium and platinum.

The catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200 to 350° C. Other processes for the preparation of Fischer-Tropsch catalysts comprise kneading/mulling, often followed by extrusion, drying/calcination and activation.

The catalytic conversion process may be performed under conventional synthesis conditions known in the art. Typically, the catalytic conversion may be effected at a temperature in the range of from 150 to 300° C., preferably from 180 to 260° C. Typical total pressures for the catalytic conversion process are in the range of from 1 to 200 bar absolute, more preferably from 10 to 70 bar absolute. In the catalytic conversion process especially more than 75 wt % of $C_5^+$, preferably more than 85 wt % $C_5^+$ hydrocarbons are formed. Depending on the catalyst and the conversion conditions, the amount of heavy wax ($C_{20}^+$) may be up to 60 wt %, sometimes up to 70 wt %, and sometimes even up till 85 wt %. Preferably a cobalt catalyst is used, a low $H_2/CO$ ratio is used and a low temperature is used (190-230° C.). To avoid any coke formation, it is preferred to use an $H_2/CO$ ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955.

Preferably, a Fischer-Tropsch catalyst is used, which yields substantial quantities of paraffins, more preferably substantially unbranched paraffins. A most suitable catalyst for this purpose is a cobalt-containing Fischer-Tropsch catalyst. Such catalysts are described in the literature, see e.g. AU 698392 and WO 99/34917.

The Fischer-Tropsch process may be a slurry FT process or a fixed bed FT process, especially a multitubular fixed bed.

The invention also provides the products obtained in the Fischer-Tropsch reaction, including distillates and hydroconverted products, e.g. fuels such as naphta, kero and diesel, base oils and n-parrafins, lower detergent feedstocks and wax.

The invention will now be illustrated with the following non-limiting examples. In all examples, the $CO_2$ concentration in the synthesis gas stream is 2.5 vol %, the $H_2O$ concentration in the synthesis gas stream is 0.18 vol %.

EXAMPLE I

A first synthesis gas stream comprising $H_2S$ and COS in amounts given in table I is led to a COS hydrolysis unit. In the COS hydrolysis unit, the first synthesis gas stream is contacted with a bed comprising titania at a temperature of 200° C., a pressure of 63.5 bara and a GHSV of 400 m³/m³/h. After COS removal, a second synthesis gas stream depleted of COS, comprising $H_2S$ and COS in amounts given in table I is led to a $H_2S$ removal zone. In the $H_2S$ removal zone, the second synthesis gas stream is contacted with a bed comprising ZnO at a temperature of 200° C. After $H_2S$ removal, a third synthesis gas stream depleted of COS and depleted of $H_2S$, comprising $H_2S$ and COS in amounts given in table I is obtained.

EXAMPLE II

A feed synthesis gas stream comprising 500 ppbv $H_2S$ and 130 ppbv COS is led to a first $H_2S$ removal zone. In the $H_2S$ removal zone, the feed synthesis gas stream is contacted with a bed comprising ZnO at a temperature of 140° C. and a GHSV of 400 m³/m³/h. A first synthesis gas stream comprising $H_2S$ and COS in amounts given in table I leaves the first $H_2S$ removal zone and is led to a COS hydrolysis unit. In the COS hydrolysis unit, the first synthesis gas stream is contacted with a bed comprising titania at a temperature of 200° C., a pressure of 63.5 bara and a GHSV of 400 m³/m³/h. After COS removal, a second synthesis gas stream depleted of COS, comprising $H_2S$ and COS in amounts given in table I is led to a second $H_2S$ removal zone. In the second $H_2S$ removal zone, the second synthesis gas stream is contacted with a bed comprising ZnO at a temperature of 200° C. After $H_2S$ removal, a third synthesis gas stream depleted of COS and depleted of $H_2S$, comprising $H_2S$ and COS in amounts given in table I is obtained.

EXAMPLE III

A first synthesis gas stream comprising $H_2S$ and COS in amounts given in table I is led to a combined COS hydrolysis/$H_2S$ removal unit. In the combined COS hydrolysis/$H_2S$ removal unit, the first synthesis gas stream is contacted with a mixed bed comprising titania and ZnO at a temperature of 200° C. and a GHSV of 300 m³/m³/h. After removal of COS and $H_2S$, a purified (third) synthesis gas stream depleted of COS and depleted of $H_2S$, comprising $H_2S$ and COS in amounts given in Table I is obtained.

TABLE I amounts of $H_2S$ and COS in the synthesis gas streams in ppbv, calculated on the synthesis gas stream.

|  | I | II | III |
|---|---|---|---|
| $H_2S$ feed syngas stream | n.a | 500 |  |
| COS feed syngas stream | n.a. | 130 |  |
| $H_2S$ first syngas stream | 100 | 1 | 2000 |
| COS first syngas stream | 30 | 130 | 2000 |
| $H_2S$ second syngas stream | 130 | 130 | n.a. |
| COS second syngas stream | 1 | 1 | n.a. |
| $H_2S$ third syngas stream | 1 | 1 | 1 |
| COS third syngas stream | 1 | 1 | 1 |

We claim:

1. A process for the removal of COS and $H_2S$ from a synthesis gas stream to very low levels, comprising: removing $H_2S$ from a feed synthesis gas stream, comprising $H_2S$ present in the range of from 500 ppbv up to 10 ppmv and COS present in the range of from 130 ppbv up to 10 ppmv, by contacting the feed synthesis gas stream with a first solid adsorbent, comprising ZnO and an inorganic support material, to obtain a first synthesis gas stream, comprising a reduced $H_2S$ concentration of up to 500 ppbv; converting COS in the first synthesis gas stream to $H_2S$ by contacting the first synthesis gas stream with a COS-hydrolysing catalyst, comprising titania, in the presence of water in a hydrolysis zone to obtain a second synthesis gas stream depleted of COS and enriched in $H_2S$; and removing $H_2S$ from the second synthesis gas stream by contacting the second synthesis gas stream with a second solid adsorbent, comprising ZnO and an inorganic support material, in an $H_2S$ removal zone to obtain a third synthesis gas stream depleted of $H_2S$ and depleted of COS, wherein said third synthesis gas stream contains 5 ppbv or less $H_2S$ and 5 ppbv or less COS.

2. A process as claimed in claim 1, wherein the COS-hydrolyzing catalyst comprising titania is supported on a carrier.

3. A process as claimed in claim 2, wherein the COS-hydrolyzing catalyst comprising titania is supported on silica.

4. A process as claimed in claim 1, wherein the first synthesis gas stream comprises 0.1-20 vol % $CO_2$ based on the synthesis gas stream.

5. A process as claimed in claim 2, wherein the COS-hydrolyzing catalyst is promoted by one or more metals selected from the group consisting of Group IA, Group IIA and the Group of the Lanthanides of the Periodic Table of the Elements.

6. A process as claimed in claim 2, wherein the COS-hydrolyzing catalyst comprises one or more metal ions selected from the group consisting of Group VB, Group VIB and Group VIIB of the Periodic Table of the Elements.

7. A process as claimed in claim 1, wherein $H_2S$ is removed from the feed synthesis gas stream at a temperature in the range of from 70 to 260° C.

8. A process as claimed in claim 4, wherein $H_2S$ is removed from the second synthesis gas stream to a level of 5 ppbv or less.

9. A process as claimed in claim 1, wherein the third synthesis gas stream is contacted with a hydrocarbon synthesis catalyst that comprises a catalytically active metal selected from the group consisting of Group VIII of the Periodic Table of Elements.

10. A process as claimed in claim 1, wherein the second solid absorbent is supported on an inorganic refractory support material selected from the group consisting of alumina, silica, titania, zirconia, carbon, silicon carbide and kieselguhr or mixtures thereof.

11. A process as claimed in claim 1, wherein $H_2S$ is removed to a level of 1 ppbv or less based on the third synthesis gas stream.

12. A process as claimed in claim 4 wherein COS is removed to a level of 5 ppbv or less based on the third synthesis gas stream.

13. A process as claimed in claim 1, wherein COS is removed to a level of 1 ppbv or less based on the third synthesis gas stream.

14. A process as claimed in claim 9, wherein the catalytically active metal is selected from the group consisting of ruthenium, iron, cobalt and nickel.

15. A process as claimed in claim 9, wherein the catalytically active metal comprises cobalt.

16. A process as claimed in claim 9, wherein the step of contacting of the third synthesis gas stream with the hydrocarbon synthesis catalyst comprises one or more hydroconversion reactions selected from the group consisting of hydrogenation, hydroisomerization, hydrocracking and hydrodewaxing.

17. A process as claimed in claim 1, wherein the feed synthesis gas stream further comprises $CO_2$ present in an amount in the range of from 0.5 to 2 vol %.

18. A process as claimed in claim 1, wherein the $H_2S$ concentration in the first synthesis gas stream is up to 300 ppbv based on the total stream.

19. A process as claimed in claim 7, wherein the $H_2S$ concentration in the first synthesis gas stream is up to 100 ppbv based on the total stream.

* * * * *